(12) United States Patent
Köhler et al.

(10) Patent No.: US 6,552,151 B1
(45) Date of Patent: Apr. 22, 2003

(54) ORGANOPOLYSILOXANE RESINS

(75) Inventors: Thomas Köhler, Kastl (DE); Walter Blüml, Simbach (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/857,661

(22) PCT Filed: Sep. 30, 1999

(86) PCT No.: PCT/EP99/07260

§ 371 (c)(1),
(2), (4) Date: Jun. 7, 2001

(87) PCT Pub. No.: WO00/35994

PCT Pub. Date: Jun. 22, 2000

(30) Foreign Application Priority Data

Dec. 11, 1998 (DE) .......................... 198 57 348

(51) Int. Cl.[7] .............................. C08G 77/16
(52) U.S. Cl. ............................. 528/10; 528/12; 528/39; 528/43
(58) Field of Search ............................. 528/10, 12, 43, 528/39

(56) References Cited

U.S. PATENT DOCUMENTS

| | | | |
|---|---|---|---|
| 4,877,837 A | | 10/1989 | Reising et al. |
| 5,998,560 A | * | 12/1999 | Decker et al. ............... 528/14 |
| 6,034,178 A | * | 3/2000 | Decker et al. .............. 525/101 |

FOREIGN PATENT DOCUMENTS

| | | |
|---|---|---|
| DE | 24 15 331 | 10/1975 |
| EP | 0 604 847 A1 | 7/1994 |

OTHER PUBLICATIONS

English Derwent Abstract Corresponding To EP 0 604 847.
English Derwent Abstract Corresponding To DE 24 15 331.

* cited by examiner

*Primary Examiner*—Margaret G. Moore
(74) *Attorney, Agent, or Firm*—Brooks & Kushman P.C.

(57) ABSTRACT

The invention relates to organopolysiloxane resins which have a glass transition temperature of more than 60° C. and OH contents of from 1 percent to 8 percent by weight.

18 Claims, No Drawings

ORGANOPOLYSILOXANE RESINS

The invention relates to organopolysiloxane resins and to their preparation.

Organopolysiloxane resins are known which have a glass transition temperature (Tg) that extends up to about 55° C. However, these organopolysiloxane resins are unstable in an environment which is at this temperature or higher since in that case they soften and their ability to be processed further is no longer assured. Also known are organopolysiloxane resins having a Tg of more than 55° C. However, the OH content of such resins is well below 1% by weight and so the reactivity of the resins is greatly reduced.

It is an object of the invention, therefore, to improve on the prior art and, in particular, to provide organopolysiloxane resins having a relatively high glass transition temperature (Tg) while retaining a heightened reactivity.

The invention provides organopolysiloxane resins having a glass transition temperature (Tg) of more than 60° C. and an OH content of at least 1% by weight based on the organopolysiloxane resin.

The organopolysiloxane resins in question are customary organopolysiloxane resins prepared in accordance with the process described below. The organopolysiloxane resins of the invention have a glass transition temperature (Tg) of from more than 60° C. up to preferably 200° C. and an OH content of from at least 1% by weight up to preferably 8% by weight and a molecular weight of preferably from 500 to 10,000 g/mol and, with particular preference, from 1000 to 8000 g/mol.

The invention further provides a process for preparing organopolysiloxane resins in which identical or different alkoxysilanes of the following general formula I:

where
R can be identical or different and denotes hydrogen atom or organic radical and R' is as defined for R,
x is from 0 to 3, and
y is from 4 to 1,
are reacted in the presence of acid, water and organic solvent having a boiling point above that of water, the acid used being removed by distillation at the end.

The radical R is preferably a linear alkyl radical of 1 to 18 carbon atoms; particular preference is given to alkyl radicals, such as the methyl, ethyl, n-propyl, isopropyl, n-butyl, isobutyl, tert-butyl, n-pentyl, isopentyl, neo-pentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical; it being possible for the alkyl radicals to be substituted preferably by mercapto radicals, epoxy-functional radicals, carboxyl radicals, amino radicals, such as the aminoethylamino radical, isocyanato radicals, acryloyloxy radicals, methacryloyloxy radicals, and/or hydroxyl radicals; alkenyl radicals, such as the vinyl and the allyl radical; cycloalkyl radicals, such as cyclopentyl, cyclohexyl, cycloheptyl radicals and methylcyclohexyl radicals; aryl radicals, such as the phenyl, naphthyl and anthryl and phenanthryl radical; alkaryl radicals such as o-, m- and p-tolyl radicals, xylyl radicals and ethylphenyl radicals; aralkyl radicals, such as the benzyl radical, the alpha- and the β-phenylethyl radical; very particular preference is given to the radicals methyl to propyl and phenyl radical.

R' corresponds in terms of its definition to the radical R.

The alkoxysilanes, which can be identical or different, are preferably employed in stoichiometric molar amounts. Preference is given in this context to ratios of the alkoxysilane RSi(OR')$_3$ of more than 50 mol % as one of the alkoxysilanes where R is phenyl and R' is ethyl. The further alkoxysilane(s) can then be any of those described by the formula I.

Acids which can be used are preferably mineral acids, such as hydrochloric acid, sulfuric acid, nitric acid or phosphoric acid, hydrochloric acid being preferred, polyacids, such as polyphosphoric acid, polyacrylic acid and polyvinylsulfuric acid; carboxylic acids such as formic acid, acetic acid, propionic acid, oxalic acid, malonic acid, succinic acid, adipic acid, benzoic acid, phthalic acid and citric acid can also preferably be used, in amounts of from 1 ppm to 1% by weight, preferably less than 0.1% by weight, based on the overall weight of the compositions.

Based on the alkoxy groups to be hydrolyzed, water is used in a molar amount of from 0.1 to 10, preferably from 0.5 to 2.

As the organic solvent having a boiling point above that of water is it preferred to use aromatic hydrocarbons such as toluene, xylene and benzene or mixtures of linear and/or branched, substituted or unsubstituted hydrocarbons, such as octane, nonane and decane, or pentanone, hexanone, heptanone, or isomers thereof, in amounts of from 1 to 1000% by weight, preferably from 10 to 100% by weight, based on the overall weight of the compositions.

The organopolysiloxane resins of the invention are prepared preferably at temperatures of from 20 to 190° C., more preferably from 40 to 150° C., and preferably at a pressure of from 500 to 10,000 hPa (abs.), more preferably from 950 to 6000 hPa (abs.) and, with particular preference, at a slightly reduced pressure of about 950 hPa (abs.).

The preparation of the organopolysiloxane resins of the invention can take place preferably continuously or preferably in accordance with a batchwise process: in the case of the batchwise process, the alcohol formed is distilled off with water in a first step and the organic solvent having a boiling point above that of water is added in a second stage, and subsequently the acid is removed by distillation.

In the case of the continuous preparation, hydrolysis with water takes place simultaneously with condensation of the organoalkoxysilanes of the general formula I. The reaction mixture is circulated preferably by means of a pump in the closed circuit system. Fresh water and the organoalkoxysilanes, and also the acidic catalyst, are supplied continuously. Diverted from the process, likewise continuously, are an appropriate fraction of the reaction mixture, comprising organopolysiloxanes of the above-described general formula I and the alcohol formed in the reaction, and also water and the acidic catalyst. After a fraction of the azeotrope (alcohol and water) has been distilled off, a sufficient amount of an organic solvent is added and the remaining alcohol in the reaction mixture is distilled off from the reaction mixture together with the water introduced initially and the acidic hydrolysis catalyst. This gives a solution of a high molecular mass organopolysiloxane in an organic solvent. If desired, the organic solvent can subsequently be removed completely by means of distillation or spray drying.

In the case of the batchwise preparation, water is added to a mixture of the preferred organoalkoxysilanes and this mixture is introduced as initial charge together with the acidic hydrolysis catalyst. Subsequently, the reaction mixture is heated to a temperature sufficient for the reaction. After a while, the reaction begins and the alcohol formed during the reaction is distilled off azeotropically together with the water introduced initially. After a fraction of the azeotrope has been distilled off, a sufficient amount of inorganic solvent is added and the alcohol remaining in the reaction mixture is distilled off from the reaction mixture together with the water introduced intitially and the acidic hydrolysis catalyst. This gives a solution of a high molecular mass organopolysiloxane in an organic solvent. If desired, the organic solvent can subsequently be removed completely by means of distillation or spray drying.

The organopolysiloxane resins of the invention, or prepared in accordance with the invention, can be used for any purpose for which organopolysiloxane resins have been used to date: for example, as binders for producing coatings or coating materials (powder coating materials) which lend themselves well to processing by virtue of their heightened reactivity. The organopolysiloxane resins of the invention have the advantage that they can still be processed even at elevated ambient temperatures of more than 55° C., since they do not coalesce. The process of the invention has the advantage, in particular, that filtration is unnecessary since no salts are formed.

strength hydrochloric acid. Subsequently, the reaction mixture is heated to reflux temperature and a fraction of the alcohol formed in the hydrolysis/condensation reaction is distilled off together with a fraction of the water introduced initially. Following the addition of 400 g of toluene, distillation is continued until an overhead temperature of 110° C. is reached. The crude product obtained is subsequently freed completely from the solvent at 150° C. and 10 mbar on a rotary evaporator.

Further Examples

The other examples listed in the table were prepared in analogy to the procedure set out above but using a different initial alkoxysilane or corresponding alkoxysilane mixture, the ratios of the alkoxysilanes indicated in the table relating to the molar amounts employed. Furthermore, organic solvents other than toluene were used, and different amounts of acidic catalyst were likewise employed.

|  | Example | | | | | | | |
| --- | --- | --- | --- | --- | --- | --- | --- | --- |
|  | 1 | 2 | 3 | 4 | 5 | 6 | 7 | 8 |
| Alkoxy-silane | PTEO | PTEO | PTEO | PTEO | PTEO | PTEO | PTEO | PTEO |
|  | — | — | — | — | PrTEO | MTEO | MTEO | TES |
|  | — | — | — | — | — | — | M2DEO | — |
| Ratio | — | — | — | — | 8:2 | 9:1 | 5:4:1 | 9:1 |
| Water | 300 g | 300 g | 300 g | 300 g | 320 g | 300 g | 450 g | 450 g |
| Hcl (20%) | 4.3 g | 2.1 g | 4.3 g | 4.2 g | 4.3 g | 4.2 g | 0.7 g | 2.4 g |
| Org. solvent | Toluene | Toluene | Xylene | MIBK | Xylene | Toluene | Toluene | Toluene |
| OH content* | 3.4% | 3.8% | 3.6% | 3.5% | 3.2% | 3.1% | 4.9% | 5.9% |
| Tg | 80° C. | 74° C. | 83° C. | 79° C. | 62° C. | 75° C. | 71° C. | 96° C. |
| Mn [g/mol] | 1298 | 1197 | 1296 | 1267 | — | 1232 | 1143 | 4036 |
| Mw [g/mol] | 1961 | 1653 | 1966 | 1898 | — | 1827 | 1679 | 1608 |
| Mw/Mn | 1.51 | 1.38 | 1.52 | 1.50 | — | 1.48 | 1.47 | 2.51 |

Key:
*= determined by the Zerewitinov method
PTEO = phenyltriethoxysilane
MTEO = methyltriethoxysilane
PrTEO = propyltriethoxysilane
M2DEO = dimethyldiethoxysilane
TES = tetraethoxysilane
MIBK = methyl isobutyl ketone

EXAMPLES

The apparatus for the batchwise preparation of the organopolysiloxane resins of the invention consists of a 2 liter four-necked round-bottomed flask which is provided with an internal thermometer, a reflux condenser and a distillation bridge with distillate receiver, and a stirring element. Heating of the flask is ensured by a heating mantel. After reaction has taken place, the reaction mixture is freed completely from the solvent, if desired, under reduced pressure on a rotary evaporator.

1$^{st}$ Example

The apparatus described above is charged with 1120 g of phenyltriethoxysilane, 300 g of water and 4.2 g of 20%

What is claimed is:

1. A solid organopolysiloxane resin having a glass transition temperature in excess of 60° C. and a hydroxyl content of greater than 2 to about 6 weight percent, based on the weight of the resin.

2. The resin of claim 1, wherein said resin comprises T units having the formula $$RSiO_{3/2}$$

wherein R is an optionally substituted $C_{1-18}$ hydrocarbon radical.

3. The resin of claim 2, wherein said T units include those where R is methyl and/or R is phenyl.

4. The resin of claim 1, wherein said hydroxyl content is from about 3 weight percent to about 6 weight percent, and said Tg is about 80° C. to 200° C.

5. The resin of claim 2, wherein said hydroxyl content is from about 3 weight percent to about 6 weight percent, and said Tg is about 80° C. to 200° C.

6. The resin of claim 3, wherein said hydroxyl content is from about 3 weight percent to about 6 weight percent, and said Tg is about 80° C. to 200° C.

7. The solid organopolysiloxane resin of claim 1, which has a molecular weight of from 500 to 10,000 g/mol.

8. The solid organopolysiloxane resin of claim 1, which as a molecular weight of from 1000 to 8,000 g/mol.

9. The solid organopolysiloxane resin of claim 1 wherein organo groups of said organopolysiloxane are selected from the group consisting of methyl, ethyl, propyl, and phenyl groups.

10. The solid organopolysiloxane resin of claim 2 wherein said resin contains dimethylsiloxy groups.

11. The solid organopolysiloxane resin of claim 9 wherein said resin has a Tg of at least 71° C.

12. A solid organopolysiloxane resin, having a glass transition temperature greater than 60° C.; and from 1 weight percent to 3 percent, based on total resin weight, of Si-bound OH groups.

13. The solid organopolysiloxane resin of claim 12, which has a molecular weight of from 500 to 10,000 g/mol.

14. The solid organopolysiloxane resin of claim 12, which has a molecular weight of from 1000 to 8,000 g/mol.

15. The solid organopolysiloxane resin of claim 12 wherein organo groups of said organopolysiloxane are selected from the group consisting of methyl, ethyl, propyl, and phenyl groups.

16. The solid organopolysiloxane resin of claim 12 wherein said resin contains dimethylsiloxy groups.

17. The solid organopolysiloxane resin of claim 12 wherein said resin has a Tg of at least 71° C.

18. The solid organopolysiloxane resin of claim 12, wherein said weight percent of-Si-bound OH groups is from 3.1 to 6.0.

* * * * *

UNITED STATES PATENT AND TRADEMARK OFFICE
CERTIFICATE OF CORRECTION

PATENT NO.     : 6,552,151 B1                                              Page 1 of 1
DATED          : April 22, 2003
INVENTOR(S)    : Thomas Köhler et al.

It is certified that error appears in the above-identified patent and that said Letters Patent is hereby corrected as shown below:

<u>Column 6,</u>
Line 3, delete "3 percent" and insert therefor -- 8 percent --.

Signed and Sealed this

Sixteenth Day of September, 2003

JAMES E. ROGAN
*Director of the United States Patent and Trademark Office*